United States Patent [19]

Aruga

[11] Patent Number: 4,609,951
[45] Date of Patent: Sep. 2, 1986

[54] RECORDING AND RECONSTRUCTING DIGITAL DATA

[76] Inventor: Masahiro Aruga, Berolzheimerstrasse 8, 8500 Nurnberg 60, Fed. Rep. of Germany

[21] Appl. No.: 588,083

[22] Filed: Mar. 9, 1984

[30] Foreign Application Priority Data

Mar. 17, 1983 [GB] United Kingdom ............... 8307428

[51] Int. Cl.⁴ .................. G11B 5/09; G11B 15/14
[52] U.S. Cl. ........................................ 360/46; 360/65
[58] Field of Search ................ 360/41, 46, 65, 67, 360/68

[56] References Cited

U.S. PATENT DOCUMENTS

| | | | |
|---|---|---|---|
| 3,953,888 | 4/1976 | Droux et al. | 360/46 |
| 4,202,016 | 5/1980 | Sampey | 360/41 |
| 4,234,898 | 11/1980 | Nakagawa et al. | 360/41 |
| 4,314,289 | 2/1982 | Haynes | 360/46 |
| 4,477,848 | 10/1984 | McWhirrer et al. | 360/60 |
| 4,485,415 | 11/1984 | Maegawa et al. | 360/46 |

Primary Examiner—Vincent P. Canney
Attorney, Agent, or Firm—James J. Ralabate

[57] ABSTRACT

A method of recording digital data on a recording medium in which a digital encoded signal is filtered to generate a succession of pulses from edges of this encoded signal. The succession of pulses is recorded on a magnetic record carrier.

6 Claims, 11 Drawing Figures

A

B

C

D

E

F

G

RECORDING AND RECONSTRUCTING DIGITAL DATA

The present invention relates to methods of recording and of reconstructing digital data and to electrical circuits operating according to the methods.

In the field of computers, particularly small computers for home or school use, means are commonly provided for recording digital programs from the computer RAM onto magnetic tape, often making use of a conventional inexpensive cassette recording machine. To this end, several methods of encoding a digital signal are known. A basic method is the so-called "tone burst" method in which the presence of an oscillatory signal indicates a "1" and the absence of such a signal indicates a "0". Such a method cannot achieve a very high density of data storage.

A second method (Kansas City Standard) utilizes a low frequency to represent a "0" and a high frequency to represent a "1". According to the version employed, from one to eight complete cycles of the frequency in question is or are recorded in each case.

A more sophisticated method is phase encoding in which a succession of "1"s or "0"s are recorded with the direction of phase shift, or shift from a high level to a low level of the signal, indicating the presence of a "1" or a "0". Thus, a positive travelling edge may represent a "1" and a negative travelling edge may represent a "0". However, the timing of the edges is all important since otherwise it would be impossible to transmit, for example, two "0"s in succession. To achieve this, a positive-going edge is interposed between the two negative-going edges and this positive-going edge is ignored by virtue of its time position in the signal. Thus, the maximum recordable density is limited by the requirement that these intermediate edges must be capable of being recorded between any two edges which are part of the digital encoding.

A further method which has become known is the so-called Sapporo City Standard. In this method, half wave edge width encoding is employed. A relatively wide pulse of positive or negative polarity represents a "0", and a relatively narrow pulse of positive or negative polarity represents a "1". However, this method is limited by the fact that it requires a definite pulse edge to define the end of any particular binary digit.

Furthermore, with this method the length of time required to record and reconstruct a given number of data bits depends upon the data pattern. A succession of "0"s will require a longer time and slow down the transmission rate. Therefore, one cannot precisely predict the time required for a block of data to be transferred even if the exact data length in terms of bytes is known.

A method which avoids this latter disadvantage is the polarity-shift encoding method. In this method, an edge is inserted only where the data changes from a "1" to a "0" or from a "0" to a "1" and this non-return to zero (NRZ) signal is directly recorded. If a succession of "1"s or a succession of "0"s are to be recorded, the pulse magnitude remains constant and the number of "1" s or "0" s is determined by a timing circuit. This method allows a much greater density of data to be stored on the tape. However, up till now its practical implementation has presented problems.

In one known method of implementing polarity-shift encoding, or non-return to zero encoding, to record a "1" the tape is magnetized in a first direction for the entire duration of the "1", and the tape is magnetized in the other direction for the entire duration of a "0". Although this produces a satisfactory output from the play-back head of a conventional cassette recording machine, the output from the amplifier of such a recorder is unfortunately so irregular that it must be passed through a bandpass filter in order to approximate the signal to the output from the play-back head. The resulting signal is not however entirely regular and may have a shifted "0" level which renders its decoding not entirely straightforward. The known method employs two to three differentiation stages as well as several delay lines, an analog multiplying stage and a combination of gates to reconstruct the data.

An object of the present invention is to provide a method of recording digital data which leads to simplified reconstruction.

According to one aspect of the invention there is provided a method of recording digital data in which a digital encoded signal is filtered to generate a succession of pulses from edges of said encoded signal and in which said succession of pulses is recorded on a magnetic record carrier.

Preferably, the signal is filtered by a high-pass filter whose cut-off frequency is between one to four times the baud rate. A filtration Q-factor of about 0.5 is recommended. A second order filter is preferably employed.

Most preferably the cut-off frequency is two to three times the baud rate.

According to a further aspect of the invention there is provided a method of reconstructing digital data recorded according to said one aspect of the invention in which said magnetic record carrier is passed over a play-back head to generate a first signal which is then amplified to provide a second signal which is processed to reconstruct said data, wherein said second signal is processed by signal level responsive means such as a Schmitt trigger circuit or the like whose output provides said digital data.

For a better understanding of the invention, and to show how the same may be carried into effect, reference will now be made, by way of example, to the accompanying drawings, in which:

FIGS. 1a and 1b, consisting of A–M, are waveform diagrams illustrating filtering of a digital signal for recording;

FIG. 2b shows waveform diagrams relating to the circuit of FIG. 2a;

Figure 4A:
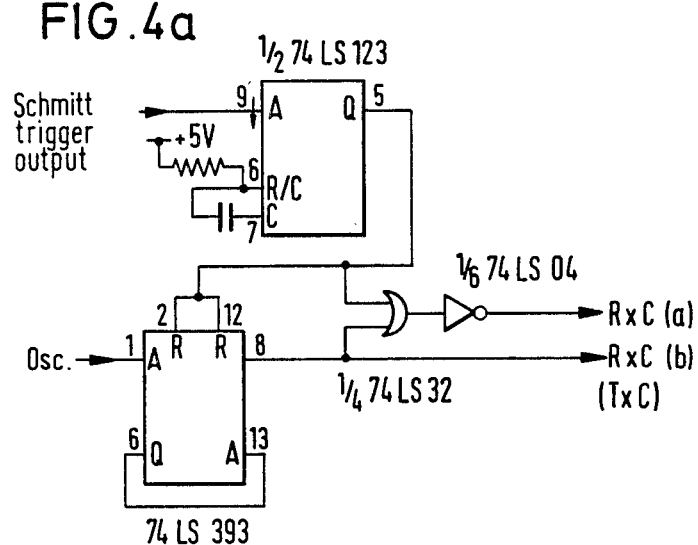
FIG. 4a shows a circuit diagram of an asynchronous single clock mode of recording.
Figure 4B:
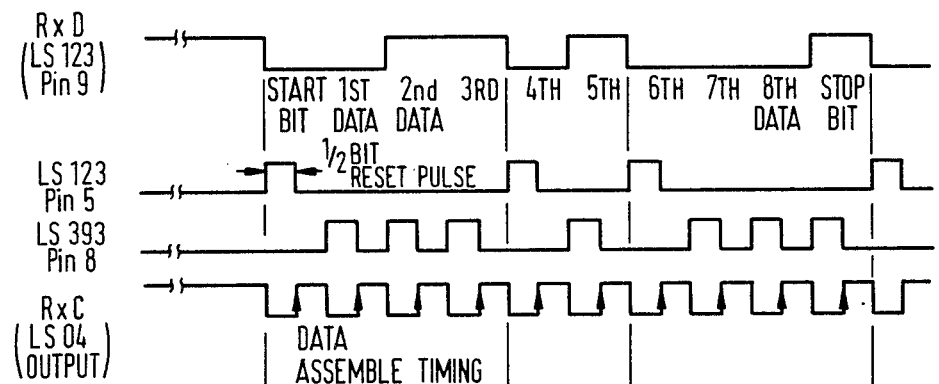
Figure 4B:
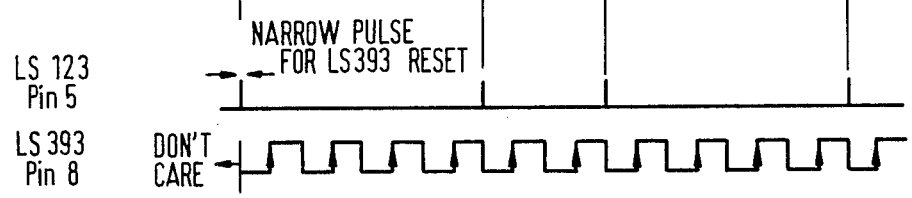
Figure 5:
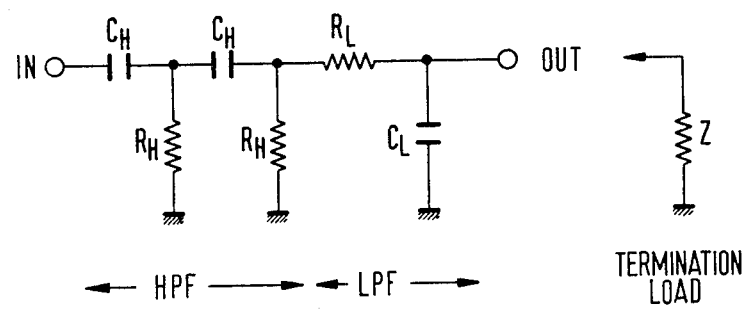

FIG. 4b, consisting of (a) and (b), shows waveform diagrams relating to the circuit of FIG. 4a;

FIG. 5 shows an alternative filtering circuit; and

Figure 6:
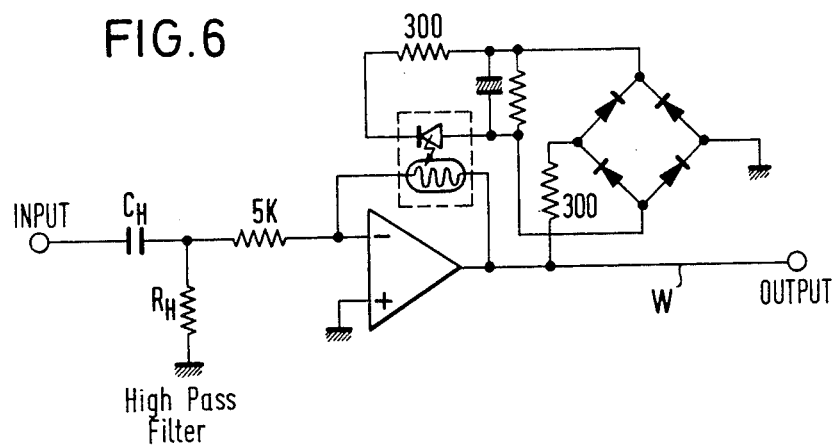

FIG. 6 shows a further pre-amplifier circuit.

Briefly summarized, the present invention contemplates processing the original digital data waveform by means of filtering to produce a relatively sharp pulse of certain characteristics from each positive or negative edge of the original data signal. In other words, the original data signal is filtered such as by a conventional RC filter of appropriate time constant. The invention further contemplates reconstructing the data by means of a simple Schmitt trigger circuit or the like.

Figure 1A:
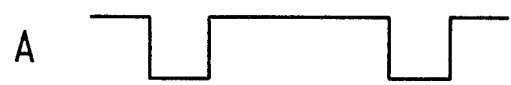
FIGS. 1c and 1d show examples of filtering circuits.
Figure 1A:
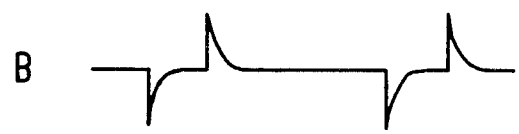
Figure 1A:
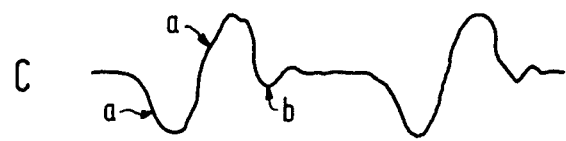
Figure 1A:
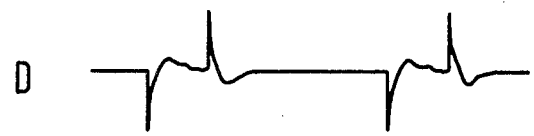
Figure 1A:
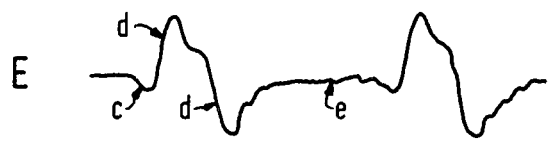
Figure 1A:
Figure 1A:
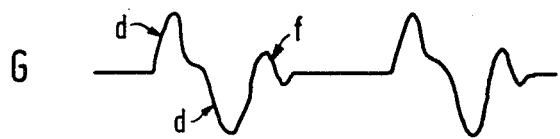
Figure 1B:
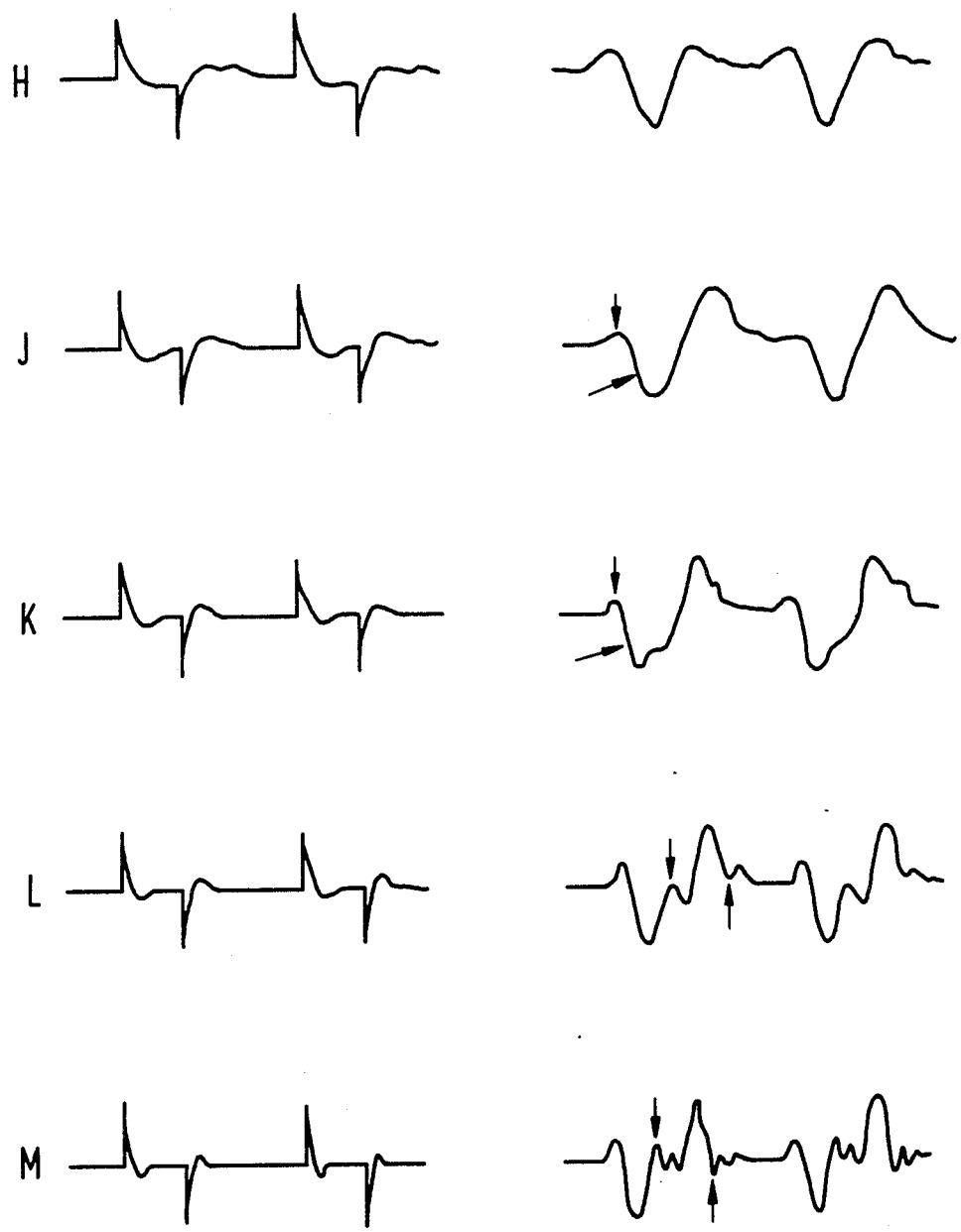

The filtering action is illustrated in FIGS. 1a and 1b. Waveform A of FIG. 1a illustrates a waveform of original digital data. FIG. 1a further illustrates the filtered waveform B as well as corresponding recorder output waveform C following filtration by a first order passive RC filter. The front slope a of the recorder output signal is rather soft which increases the possibility of decoding error when using a Schmitt trigger since the time at which the Schmitt trigger circuit is activated varies according to the pulse amplitude. Also a degree of unstable overshoot is present at the rear slopes b of the pulses.

A second example depicts waveforms D and E related to a second order passive RC filter. The Q-factor of the RC filter is 0.5. Here, the filter output waveform D contains a certain degree of overshoot while the preceding example exhibits a very gradual transition of the filtered signal. Due to this overshoot, the recorder output signal E now appears with different characteristics. Firstly, the front slope d of pulses of positive or negative polarity is much steeper and is preceded by a small degree of pre-shoot c. Secondly, the polarity of the reproduced signal is reversed with respect to the previous example. Lastly, the intermediate portion e of the signal between the two sharp edges is of constant polarity and does not have a shifted zero level. In other words, the reproduced signal possesses ideal characteristics for operating a Schmitt trigger circuit.

A third example illustrates the waveforms F and G in respect of a second order active filter whose Q-factor is $1/\sqrt{2}$ (larger than 0.5). The filter output F presents a higher degree of overshoot. Like the second order passive filter, the recorder output G has steep rising and falling edges d but without pre-shoot. The signal, however, contains overshoot f at the rear ends of the signal pulses which extends onto the pulse of opposite polarity, thus reducing if not taking away the Schmitt trigger margin. An active filter of higher Q-factor will only emphasize the overshoot and the reverse overshoot and cannot therefore produce a recorded signal suitable for triggering a Schmitt trigger circuit.

From above considerations it can be now summarized that a second order high-pass filter whose Q-factor is of the order of 0.5 or thereabouts is suitable for reconstruction of the original data by means of a Schmitt trigger circuit.

FIG. 1b illustrates waveforms H, J, K, L and M obtained through filters of various cut-off frequencies and the corresponding recorder output signals. The filtered signals are on the left and the recorder output signals on the right in each case. The cut-off frequencies $f_c$ are as follows where Z is the baud rate:

| waveforms | $f_c$ |
|---|---|
| H | 0.5Z |
| J | Z |
| K | 2Z |
| L | 4Z |
| M | 8Z |

Although the range may vary slightly depending upon the recorder characteristics and types of magnetic tapes used, it is found that a cut-off frequency of one to four times the baud rate is likely to produce a recorder output of acceptable quality. When the cut-off frequency is too low for the baud rate, as in the case of 0.5 times the baud rate illustrated as waveforms H, the recorder output becomes asymmetrical accompanied by a noticeable degree of "zero" level shift according to the recorded data pattern. Furthermore, the slope of the waves becomes too mild resulting in inaccurate reproduction of the original data.

On the other hand, if the cut-off frequency is too high, overshoot pulses will appear and cut across the "zero" level as illustrated as waveforms M (8 times the baud rate). A certain amount of overshoot, however, can be allowed as illustrated as waveforms L (the case of 4 times the baud rate) where the overshoot or aftershoot portion stays at the same polarity. A cut-off frequency $f_c$ of 2 to 3 times the baud rate is likely to produce the most desirable results, but acceptable results may be achieved with a value of $f_c$ between 1 and 4 times the baud rate. Waveforms K illustrate an ideal case with relatively sharp slopes and a small amount of preshoot.

Figure 1C:
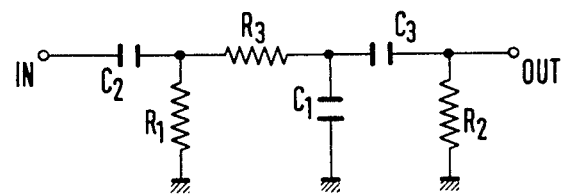
Figure 1D:
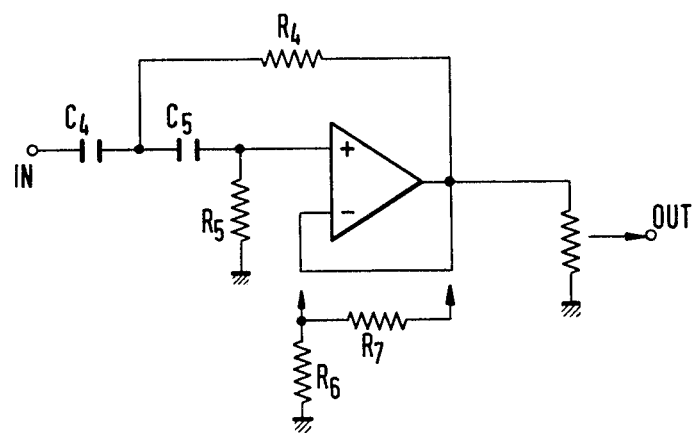

The filtering requirements may be summarized as follows: 2nd order high-pass filter with $Q \approx 0.5$ and cut-off frequency $f_c$ preferably in the range $2Z < f_c < 3Z$ (where $Z$=baud rate) although the range $Z \leq f_c \leq 4Z$ is acceptable. FIG. 1c shows a suitable passive RC filter where preferably $R_1 = R_2 = R_3 = R$, $C_2 = C_3 = C$ and $C/4 < C_1 < C/2$. Approximate values of C and R may be obtained from the formula $$f_c = \frac{1}{2\pi RC}$$

although the actual cut-off frequency of the high-pass filter will be shifted to some extent owing to coupling with the low-pass filter section. A final determination of the values can be made in the actual environment by referring to the waveform chart presented in FIG. 1b. Since the passive RC filter attenuates the signal greatly, an active filter may also be used as shown in FIG. 1d. In this case, however, the value of feed-back resistor $R_4$ should be carefully selected. A value of $R_4$ between 2 to 3 times the value of $R_5$ may produce acceptable results. Resistors $R_6$ and $R_7$ are optional to add gain. $f_c = \frac{1}{2}\pi \sqrt{R_1 \cdot C_1 \cdot R_2 \cdot C_2}$. Preferably $2R_2 \leq R_1 \leq 3R_2$.

Thus, the filter produces edge pulses corresponding to the rising and falling edges of the data present to be recorded. By means of the filter, the DC component of the data is eliminated and the edges are transformed into sharp edge pulses of both positive and negative polarity corresponding to rising and falling edges respectively.

By use of this filtered signal, digital data may be recorded upon a conventional magnetic tape cassette, using a conventional magnetic tape cassette recorder. This is applicable to, for example, the problem of recording digital data from a RAM of a personal computer using a conventional magnetic tape recording machine for permanent storage. A computer-cassette recorder interface may be constructed utilizing this filtering technique and encoding the data by polarity-shift encoding.

Figure 2A:
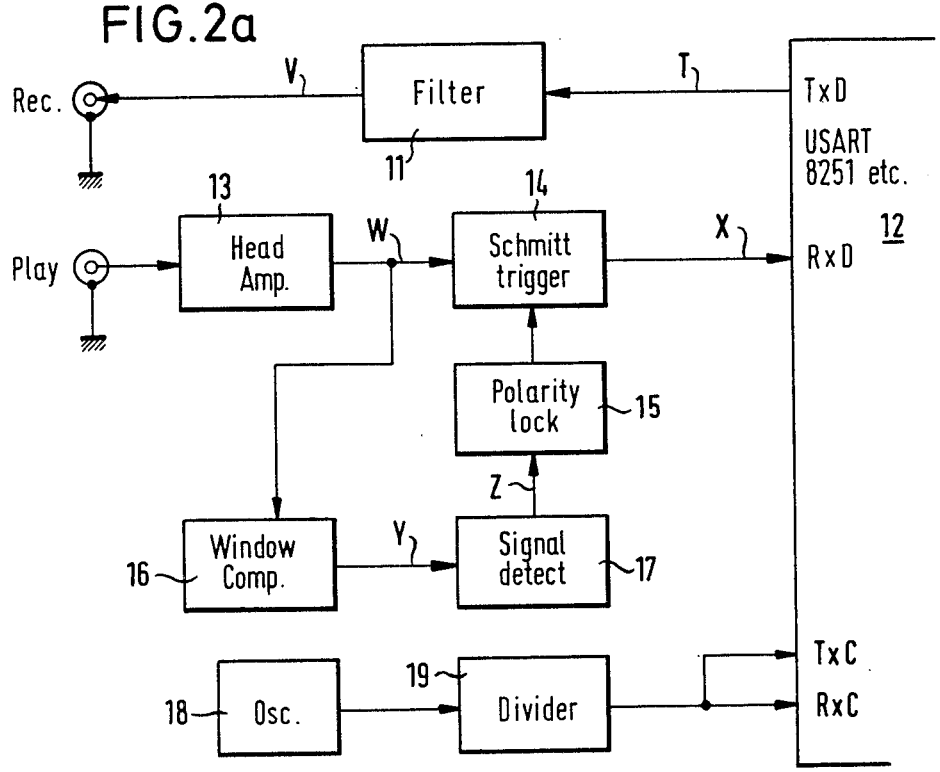
FIG. 2a shows a block schematic circuit diagram of an asynchronous multi-clock mode recording arrangement.

A first circuit arrangement suitable for use in such an interface and employing an asynchronous multi-clock mode of processing is illustrated in FIG. 2a.

The block circuit diagram of FIG. 2a employs a universal synchronous/asynchronous receiver/transmitter (USART) which is represented by the block 12 and is a product of Intel Corporation, USA. Full details of the USART may be obtained from the manufacturers, but basically the USART receives serial data streams and converts them into parallel data characters for a processor. Similar communication LSIs are available for various microprocessor families such as the Zilog Z80 SIO (Serial Input Output) designed for the Z80 microprocessor and the 6850 (ACIA: Asynchronous Communication Interface Adapter) for the Motorola 6809 microprocessor, etc. The methods and circuits presented in this specification can be easily modified for applications with such communication LSIs. The USART can not only receive serial data but can also accept data characters from the processor in parallel format, convert them to serial format and transmit. The USART will signal the processor when it has completely received or transmitted a character and requires service.

From the transmitter data pin $T \times D$ (pin 19) of the USART, data T is taken to a filter circuit 11 which performs the filtering action as discussed with reference to FIGS. 1a and 1b. From the output of the filter 11, a data signal V is taken to a suitable input, e.g. the microphone input of a conventional cassette recorder and is thereby recorded on magnetic tape. The recording level is of course set to a value as high as possible whilst avoiding significant distortion. A setting at about half the maximum may be found acceptable.

From the transmitted data output $T \times D$ of the USART, in the asynchronous transmission mode, data bits are transmitted in serial form in a specific format. This format begins with a start bit, followed by five to eight data bits, then an optional parity bit, and finally one or more stop bits.

Following recording on the tape, the data may be played back and extracted for example from the headphone output socket of the recorder machine. Since the level of a headphone or earphone output of a recorder is usually too low to operate directly a Schmitt trigger circuit composed of an FET operational amplifier, an amplifying stage 13 is included before supplying the reproduced data W to a Schmitt trigger circuit 14. The output X of the Schmitt trigger circuit is taken to the receiver data input $R \times D$ (pin 3) of the USART 12. Although the amplification stage 13 is necessary, the waveform maintains a stable "0" level as a result of the correct choice of filtering factor as described with reference to FIGS. 1a, 1b and 1c.

Also connected to receive the output W of the amplifier 13 is a window comparator 16. This produces an output only when the amplitude of the input falls outside a certain "window" of amplitude. Thus it gives rise to one pulse for each edge of the original data signal. The window comparator output Y having rising edges is supplied to a signal detecting circuit 17, in which is provided a retriggerable monostable multivibrator with clear (type 74LS123) the output Z of which remains high as long as input signals are detected within a predetermined interval. The output Z of this monostable multivibrator is supplied to a polarity lock circuit 15 which upon receipt of a high output signal from the detection circuit 17 releases the Schmitt trigger circuit. When there is no signal for decoding and the output of the signal detecting circuit falls to the low level, the polarity lock circuit 15 applies a high voltage to the non-inverting input of the Schmitt trigger circuit forcing its output X to maintain the high level. Such a procedure is necessary to keep the "receive data" input $R \times D$ of the USART at a high level when there is no signal requiring decoding. This is a necessary requirement for use of the USART.

Figure 2B:
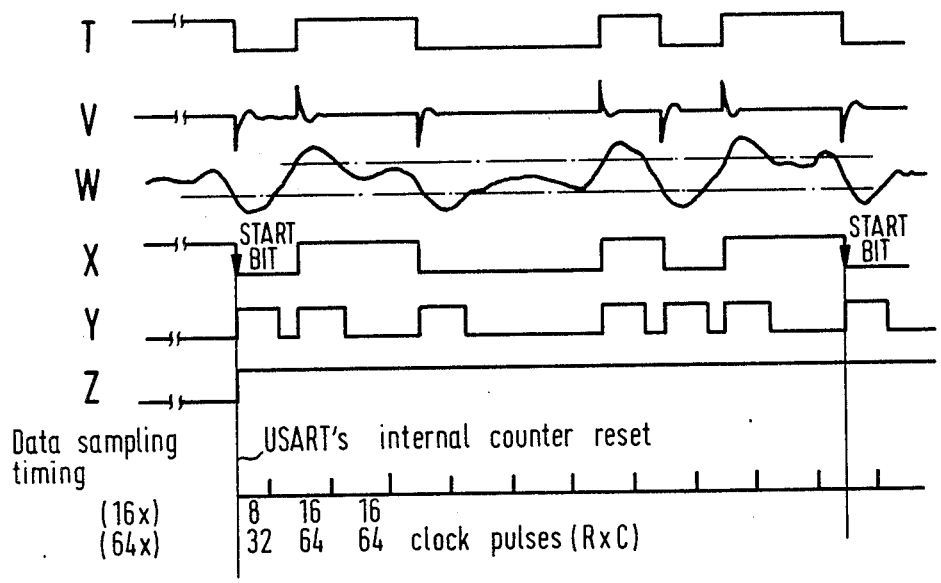

FIG. 2b shows the waveforms T, V, W, X, Y and Z as well as clock pulses delivered by an oscillator 18 and divider 19.

Having established the presence of a data signal on its input, the USART starts its data assembly operation when the received data line falls to a low level indicating the beginning of the start bit. This resets the internal clock counter of the USART as shown in the bottom line of FIG. 2b and the input data is then sampled at the programmed clock interval until the stop bit is detected. Detection of each start bit resets the internal counter so that successive sets of data can be correctly read. The oscillator 18 supplies a timing clock via the divider 19 to the receiver clock input $R \times C$ (pin 25) and the transmitter clock input $T \times C$ (pin 9) at a speed appropriate to the selected clock rate of sixteen times or sixty-four times the baud rate.

Figure 3:
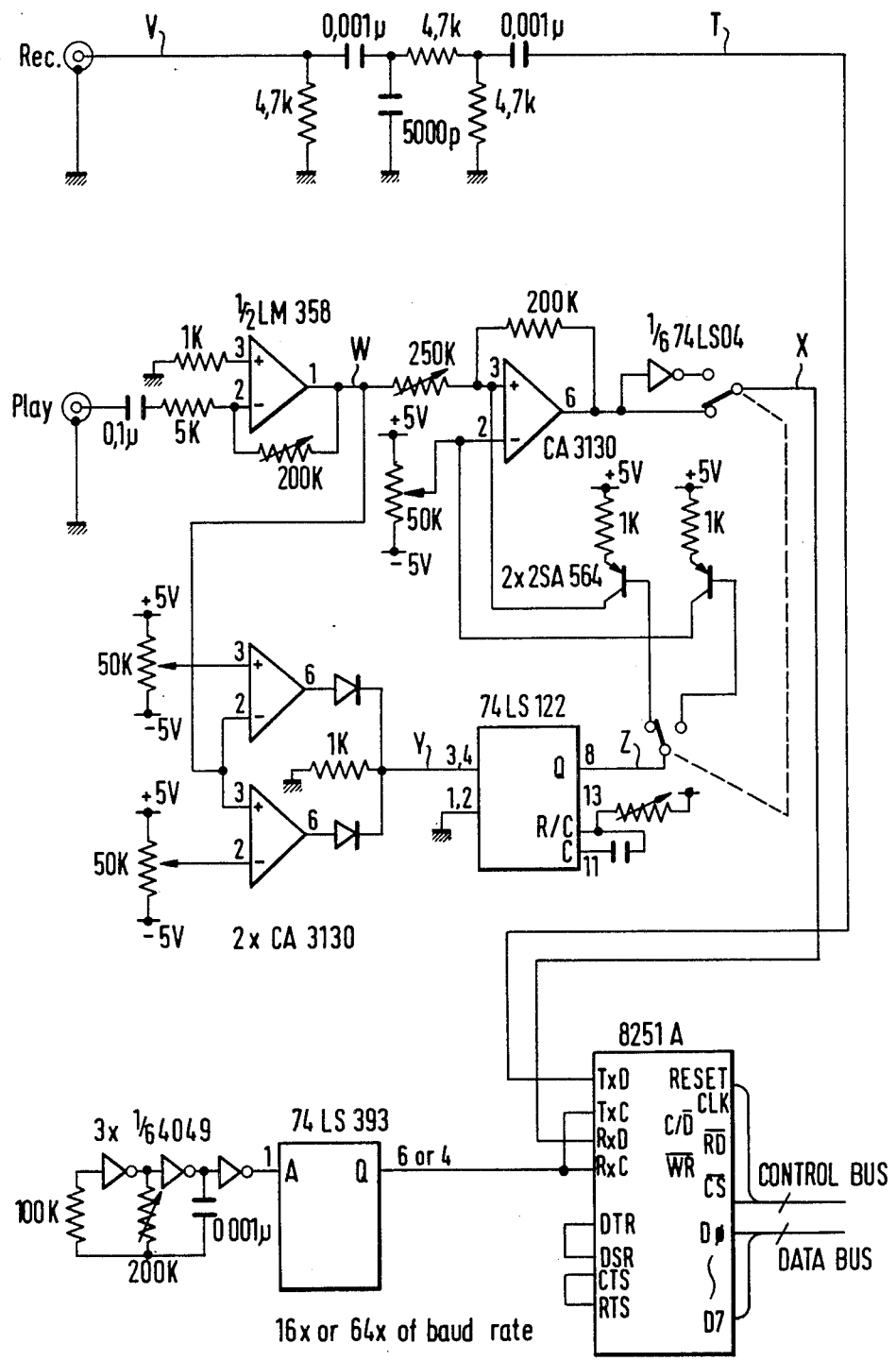
FIG. 3 shows a more detailed circuit diagram of the circuit arrangement of FIG. 2.

FIG. 3 is a more detailed circuit diagram of the arrangement of FIG. 2a where it can be seen that the filter circuit 11 designed for a baud rate of 8K to 16K comprises three 4.7K resistors, two series capacitors each of 0.001 microfarads, and a shunt capacitor of 5000 picofarads. The head amplifier is formed from an integrated circuit type LM358, the Schmitt trigger is constituted by an amplifier type CA3130, the window comparator is formed from two amplifier types CA3130, and the signal detecting circuit 17 is a retriggerable mono-stable multi-vibrator (type 74LS122).

The polarity lock circuit is composed of a transistor type 2SA564 and a resistor. As described earlier, if the output of multivibrator 17 (74LS122) (pin 8) becomes low indicating absence of recorded signal, the transistor supplies plus five volts to the non-inverting input of the Schmitt trigger circuit 14 (CA3130) (pin 3). Thus, the receiver data line ($R \times D$) of the USART can be kept at the high level.

In some cases, the polarity of the recorder output is reversed. For this reason a polarity changeover circuit is also provided in FIG. 3.

It is also possible to program the USART for the so-called "single clock mode" in which the clock rate corresponds to the baud rate. In this mode, the USART's internal counter cannot synchronize itself with the receiver data input. One therefore needs to synchronize the receiver clock input externally with the data signal (receiver data).

Referring now to the circuit of FIG. 4a and corresponding waveforms of FIG. 4b, two methods of achieving this synchronization are suggested:

(a) As shown in the upper portion of FIG. 4b, a relatively wide pulse can be generated, e.g. at pin 5 of a retriggerable monostable multivibrator (type 74LS123), at every falling edge of the receiver data signal. The pulse width is adjusted to half of one bit data width. This pulse is used to reset the receiver clock generator circuit (divider counter type 74LS393). By supplying the reset pulse and the receiver clock generator output to a NOR gate, a synchronized receiver clock can be produced. As illustrated, the NOR gate is constituted by an OR gate (type 74LS32) and an inverter (type 74LS04).

(b) Alternatively, as shown in the lower portion of FIG. 4b, a very narrow pulse can be generated by the monostable multivibrator at every falling edge of the receiver data signal and this pulse can be used to reset the receiver clock generator circuit, whose output (pin 8) provides the receiver clock directly.

It is also possible to carry out the invention using circuitry which does not employ the USART.

The filtering circuit used for recording may also be constructed as shown in FIG. 5. The two RC pairs which constitute a 2nd order high-pass filter are directly coupled. Here, the cut-off frequency, $f_{Hc}$, can be calculated as follows:

$$f_{Hc} = 2.67/2\pi R_H C_H$$

As described earlier, the $f_{Hc}$ may be selected from the range of $$Z \leq f_{Hc} \leq 4Z \quad (Z = \text{baud rate})$$

A terminating low-pass filter is also recommended whose cut-off frequency, $f_{Lc}$, is in the range defined as follows:

$$0.7Z/A \leq f_{Lc} \leq 5.6Z/A^2$$

where $A = f_{Hc}/Z$.

The value of $R_L$ and $C_L$ can be calculated from the formula:

$$f_{Lc} = \tfrac{1}{2}\pi R_L C_1 \text{ (without load)}$$

In both cases, the load to be connected must be taken into consideration and the value of components should be adjusted accordingly.

An ALC circuit may be included in front of the Schmitt trigger.

Since variation of amplitude of played-back signal, due to characteristic of magnetic recording media, etc., tends to affect the Schmitt trigger response, it is advantageous to maintain the level of the signal, which is fed to the Schmitt trigger, in a workable range.

The pre-amplifier in FIG. 3 may be replaced by the circuit shown in FIG. 6. Here, an LED-CdS photo coupler is used as a feed-back element. The resistance of the CdS cell is used for determination of amplitude. If the signal exceeded a certain predetermined level, the LED emits light to the CdS. In response the CdS resistance will decrease lowering the amplitude of the section. Thus, the output level can be maintained at a predetermined level.

A high-pass filter may be added in play-back section if desired.

A first order high-pass filter may be added in the preamplifier section to further minimize the "0" level shift and peak shift of the play-back signal.

The cut-off frequency of the high-pass filter may be selected from the range given below:

$$0.5Z \leq f_{Hc} \leq Z$$

It will be apparent to those skilled in the art that the methods and circuits described herein according to the invention are applicable not only to NRZ (non-return to zero) data, but also to digital data encoded according to other standards such as mentioned in the introduction to this specification (but not the tone burst method). Other forms of reconstruction circuit will of course be necessary, but reliability of recording and reproduction may be improved.

What is claimed is:

1. A method of recording digital data in which a digital encoded signal is filtered by a second order high-pass filter to generate a succession of pulses from edges of said encoded signal and in which said succession of pulses is recorded on a magnetic record carrier and in which said filter has a cut-off frequency in the range of from one to four times the baud rate.

2. A method according to claim 1 wherein the cut-off frequency is in the range of from two to three times the baud rate.

3. A method according to claim 1 wherein the filter has a Q-factor of about 0.5.

4. A method of recording digital data in which a digital encoded signal is filtered by a second order high-pass filter to generate a succession of pulses from edges of said encoded signal and in which said succession of pulses is recorded on a magnetic record carrier and in which said filter has a cut-off frequency in the range of from one to four times the baud rate, and wherein said data is NRZ data.

5. A method according to claim 4 wherein the cut-off frequency is in the range of two to three times the baud rate.

6. A method according to claim 4 wherein the filter has a Q-factor of about 0.5.

* * * * *